(12) United States Patent
Suzuki et al.

(10) Patent No.: US 12,347,471 B2
(45) Date of Patent: Jul. 1, 2025

(54) MAGNETIC DISK DEVICE AND METHOD

(71) Applicants: Kabushiki Kaisha Toshiba, Tokyo (JP); Toshiba Electronic Devices & Storage Corporation, Tokyo (JP)

(72) Inventors: Sho Suzuki, Tokyo (JP); Takayuki Kawabe, Sagamihara Kanagawa (JP); Takeyori Hara, Kawasaki Kanagawa (JP); Naoki Tagami, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 121 days.

(21) Appl. No.: 18/119,254

(22) Filed: Mar. 8, 2023

(65) Prior Publication Data

US 2024/0105225 A1    Mar. 28, 2024

(30) Foreign Application Priority Data

Sep. 22, 2022  (JP) .................................. 2022-151376

(51) Int. Cl.
*G11B 5/596* (2006.01)
(52) U.S. Cl.
CPC ................................ *G11B 5/59627* (2013.01)
(58) Field of Classification Search
None
See application file for complete search history.

(56) References Cited

U.S. PATENT DOCUMENTS

| | | | |
|---|---|---|---|
| 6,975,478 B2 | 12/2005 | Fukushima et al. | |
| 7,315,430 B2 * | 1/2008 | Kisaka | G11B 5/5526 |
| 9,502,062 B1 | 11/2016 | Dorobantu et al. | |
| 9,799,360 B2 | 10/2017 | Tagami | |
| 10,854,238 B2 | 12/2020 | Tagami et al. | |
| 11,152,029 B2 * | 10/2021 | Nakamura | G11B 5/596 |
| 11,979,483 B2 * | 5/2024 | Lee | H04L 9/0618 |
| 2017/0263275 A1 * | 9/2017 | Tagami | G11B 20/1217 |
| 2019/0287560 A1 * | 9/2019 | Tagami | G11B 20/10388 |
| 2020/0090691 A1 * | 3/2020 | Tagami | G11B 5/59655 |
| 2020/0335129 A1 * | 10/2020 | Tagami | G11B 5/59655 |
| 2022/0093124 A1 * | 3/2022 | Kudo | G11B 5/59627 |
| 2022/0093129 A1 * | 3/2022 | Kubota | G11B 5/596 |

* cited by examiner

*Primary Examiner* — Fred Tzeng
(74) *Attorney, Agent, or Firm* — Maier & Maier, PLLC

(57) ABSTRACT

A controller of a magnetic disk device obtains, for each of a plurality of first position sets, a first distribution that is a radial distribution of differences between a target orbit of the magnetic head and an actual position of the magnetic head while correcting a disturbance synchronized with rotation of the magnetic disk by using correction amounts at a plurality of positions included in one of the plurality of first position sets. The controller performs weighting the first distribution according to a position in the radial direction and calculating an evaluation value based on the weighted first distribution for each of the plurality of first position sets. The controller selects a second position set from the plurality of first position sets based on the evaluation value. The controller records correction amounts at a plurality of positions included in the second position set by the magnetic head.

15 Claims, 13 Drawing Sheets

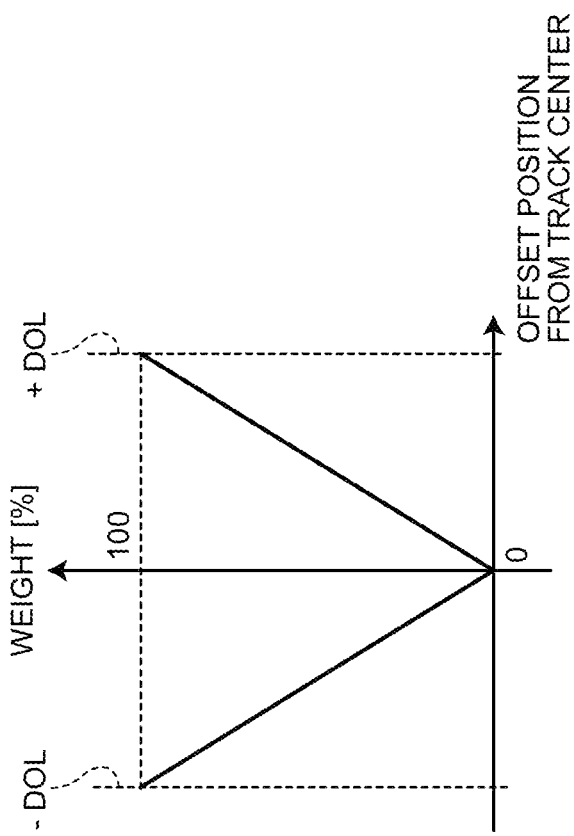
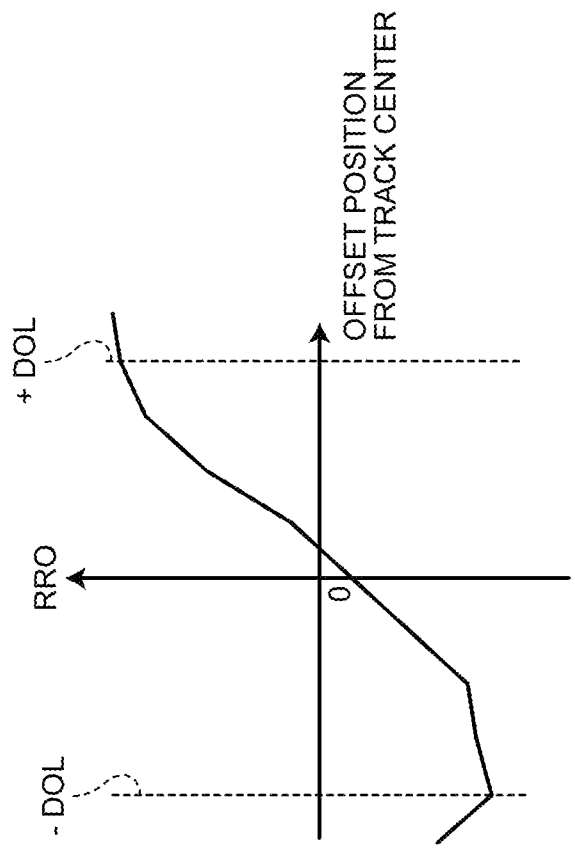

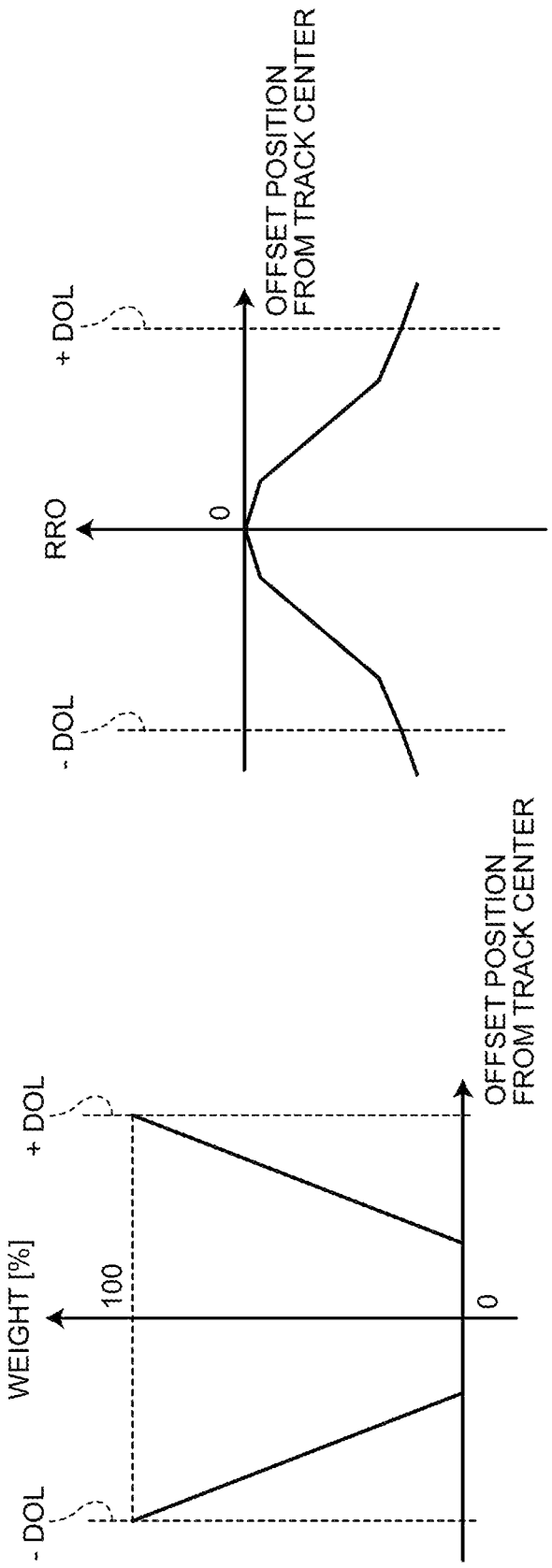

FIG.9

| UNIT REGION (ZONE, CIRCUMFERENTIAL POSITION) | WEIGHT FUNCTION |
|---|---|
| SERVO #0, SERVO SECTOR #0 | POINTER TO $f_A(x)$ |
| SERVO #0, SERVO SECTOR #1 | POINTER TO $f_A(x)$ |
| SERVO #0, SERVO SECTOR #2 | POINTER TO $f_B(x)$ |
| SERVO #0, SERVO SECTOR #3 | POINTER TO $f_C(x)$ |
| ⋮ | ⋮ |

MAGNETIC DISK DEVICE AND METHOD

CROSS-REFERENCE TO RELATED APPLICATIONS

This application is based upon and claims the benefit of priority from Japanese Patent Application No. 2022-151376, filed on Sep. 22, 2022; the entire contents of which are incorporated herein by reference.

FIELD

Embodiments described herein relate generally to a magnetic disk device and a method.

BACKGROUND

In the related art, a repeatable runout (RRO) is known as a disturbance received when accessing a magnetic disk in a magnetic disk device. The RRO is a disturbance caused by deviation of a track defined by a burst pattern from the ideal track, and fluctuates in synchronization with the rotation of a magnetic disk (and a spindle motor).

In a process of manufacturing the magnetic disk device, a correction amount for correcting the positional deviation by the RRO is learned, and the obtained correction amount is recorded on the magnetic disk. When the magnetic disk device is used, the position of a magnetic head is corrected by using the correction amount recorded on the magnetic disk.

BRIEF DESCRIPTION OF THE DRAWINGS

FIGS. 6A and 6B are diagrams illustrating another example of the weight function according to the first embodiment;

FIGS. 7A and 7B are diagrams illustrating still another example of the weight function according to the first embodiment;

FIG. 9 is a diagram illustrating an example of a data configuration according to the first embodiment;

DETAILED DESCRIPTION

In general, according to one embodiment, a magnetic disk device includes a magnetic disk, a magnetic head, and a controller. The magnetic disk has a track provided with a first servo sector. The magnetic head writes data to the magnetic disk and reads data from the magnetic disk. The controller sets a plurality of first position sets. Each of the plurality of first position sets is a set including a plurality of positions in a radial direction on the track. The controller obtains, for each of the plurality of first position sets, a first distribution that is a radial distribution of differences while correcting a disturbance synchronized with rotation of the magnetic disk by using correction amounts at a plurality of positions included in one of the plurality of first position sets. Each of the differences is a difference between a target orbit of the magnetic head and an actual position of the magnetic head. The controller performs an operation of weighting the first distribution according to a position in the radial direction and calculating an evaluation value based on the weighted first distribution for each of the plurality of first position sets. The controller selects a second position set from the plurality of first position sets based on the evaluation value calculated for each of the plurality of first position sets. The controller records correction amounts at a plurality of positions included in the second position set in the first servo sector by the magnetic head.

Hereinafter, a magnetic disk device and a method according to embodiments will be described in detail with reference to the accompanying drawings. Note that the present invention is not limited by the embodiments.

First Embodiment

Figure 1:
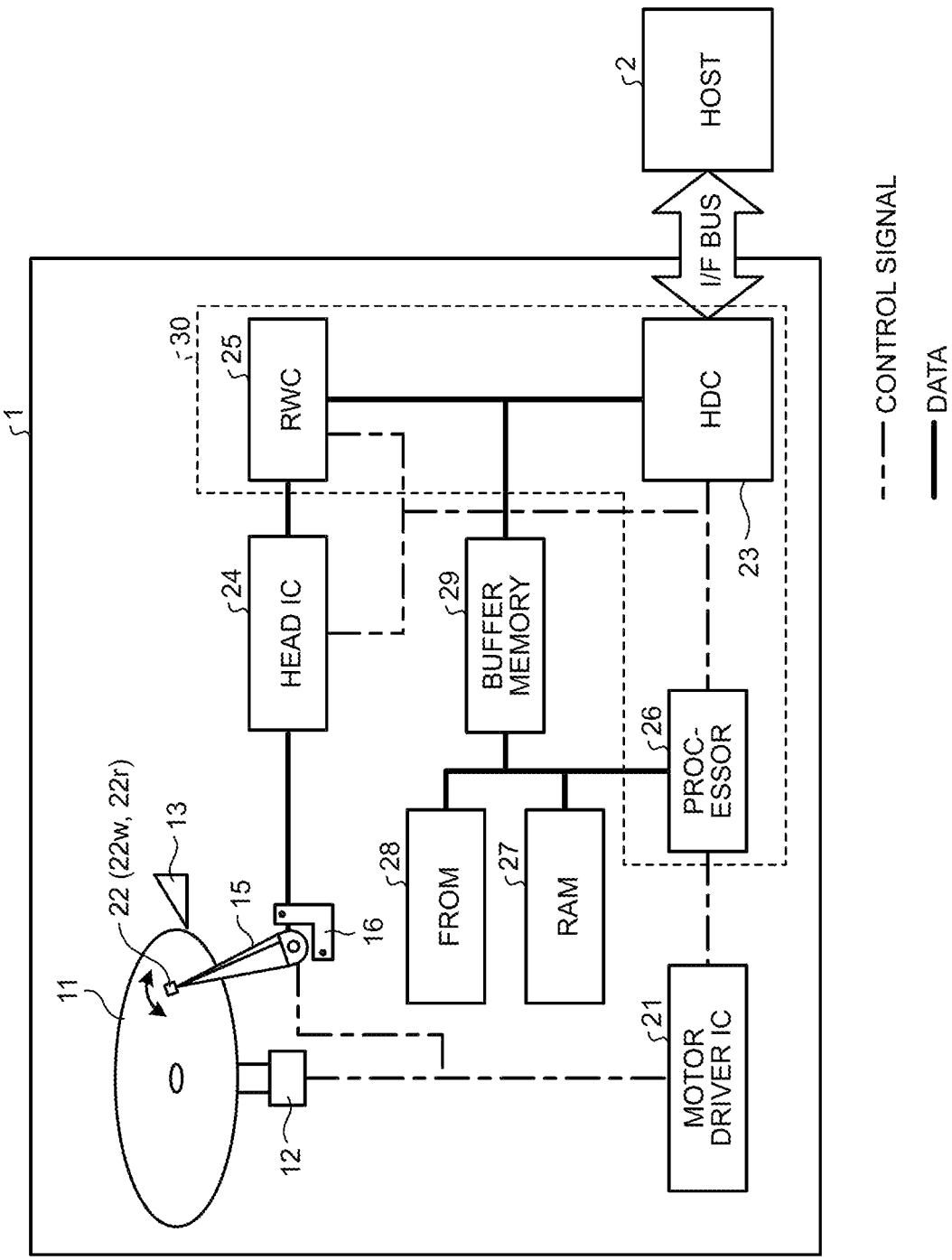
FIG. 1 is a schematic diagram illustrating an example of a configuration of a magnetic disk device according to a first embodiment.

FIG. 1 is a schematic diagram illustrating an example of a configuration of a magnetic disk device 1 according to a first embodiment.

The magnetic disk device 1 is connected to a host 2. The magnetic disk device 1 can receive an access command such as a write command or a read command from the host 2.

The magnetic disk device 1 includes a magnetic disk 11 having a magnetic layer formed on a surface thereof. The magnetic disk device 1 writes data to the magnetic disk 11 or reads data from the magnetic disk 11 in response to the access command.

Data is written and read to and from the magnetic disk 11 via a magnetic head 22. Specifically, in addition to the magnetic disk 11, the magnetic disk device 1 includes a spindle motor 12, a lamp 13, an actuator arm 15, a voice coil motor (VCM) 16, a motor driver integrated circuit (IC) 21, the magnetic head 22, a hard disk controller (HDC) 23, a head IC 24, a read/write channel (RWC) 25, a processor 26, a RAM 27, a flash read only memory (FROM) 28, and a buffer memory 29.

The magnetic disk 11 is rotated at a predetermined rotation speed by the spindle motor 12 attached coaxially. The spindle motor 12 is driven by the motor driver IC 21.

The processor 26 controls the rotation of the spindle motor 12 and the rotation of the VCM 16 via the motor driver IC 21.

The magnetic head 22 writes and reads information to and from the magnetic disk 11 using a write head 22w and a read head 22r provided therein. The magnetic head 22 is attached to a distal end of the actuator arm 15. The magnetic head 22 is moved in the radial direction of the magnetic disk 11 by the VCM 16 driven by the motor driver IC 21.

For example, when the rotation of the magnetic disk 11 is stopped, the magnetic head 22 is moved onto the lamp 13. The lamp 13 is configured to hold the magnetic head 22 at a position separated from the magnetic disk 11.

The head IC 24 amplifies and outputs a signal read from the magnetic disk 11 by the magnetic head 22 at the time of reading and supplies the signal to the RWC 25. In addition, at the time of writing, the head IC 24 amplifies a signal corresponding to data to be written supplied from the RWC 25 and supplies the amplified signal to the magnetic head 22.

The HDC 23 performs control of transmission and reception of data to and from the host 2 via an I/F bus, control of the buffer memory 29, an error correction process of read data, and the like.

The buffer memory 29 is used as a buffer for data transmitted to and received from the host 2. For example, the buffer memory 29 is used to temporarily store data to be written to the magnetic disk 11 or data read from the magnetic disk 11.

The buffer memory 29 includes, for example, a volatile memory that enables a high-speed operation. The type of the memory that configures the buffer memory 29 is not limited to a specific type. The buffer memory 29 may be configured by, for example, a dynamic random access memory (DRAM), a static random access memory (SRAM), or a combination thereof.

The RWC 25 modulates data to be written supplied from the HDC 23 and supplies the modulated data to the head IC 24. In addition, the RWC 25 demodulates a signal read from the magnetic disk 11 and supplied from the head IC 24 and outputs the demodulated signal to the HDC 23 as digital data.

The processor 26 is, for example, a central processing unit (CPU). The RAM 27, the flash read only memory (FROM) 28, and the buffer memory 29 are connected to the processor 26.

The FROM 28 is a nonvolatile memory. The FROM 28 stores firmware (program data), various operation parameters, and the like. Note that the firmware may be stored in the magnetic disk 11.

The RAM 27 is configured by, for example, a DRAM, an SRAM, or a combination thereof. The RAM 27 is used as an operation memory by the processor 26. The RAM 27 is used as an area into which firmware is loaded and an area in which various types of management data are stored.

The processor 26 performs overall control of the magnetic disk device 1 according to the firmware stored in the FROM 28 or the magnetic disk 11. For example, the processor 26 loads firmware from the FROM 28 or the magnetic disk 11 into the RAM 27 and controls the motor driver IC 21, the head IC 24, the RWC 25, the HDC 23, and the like according to the loaded firmware.

Note that a configuration including the RWC 25, the processor 26, and the HDC 23 can also be regarded as a controller 30. The controller 30 may include other elements (such as the RAM 27, the FROM 28, the buffer memory 29, or the RWC 25), in addition to the RWC 25, the processor 26, and the HDC 23.

Furthermore, a firmware program may be stored in the magnetic disk 11. Some or all of the functions of the processor 26 may be implemented by a hardware circuit such as a field-programmable gate array (FPGA) or an application specific integrated circuit (ASIC).

Figure 2:
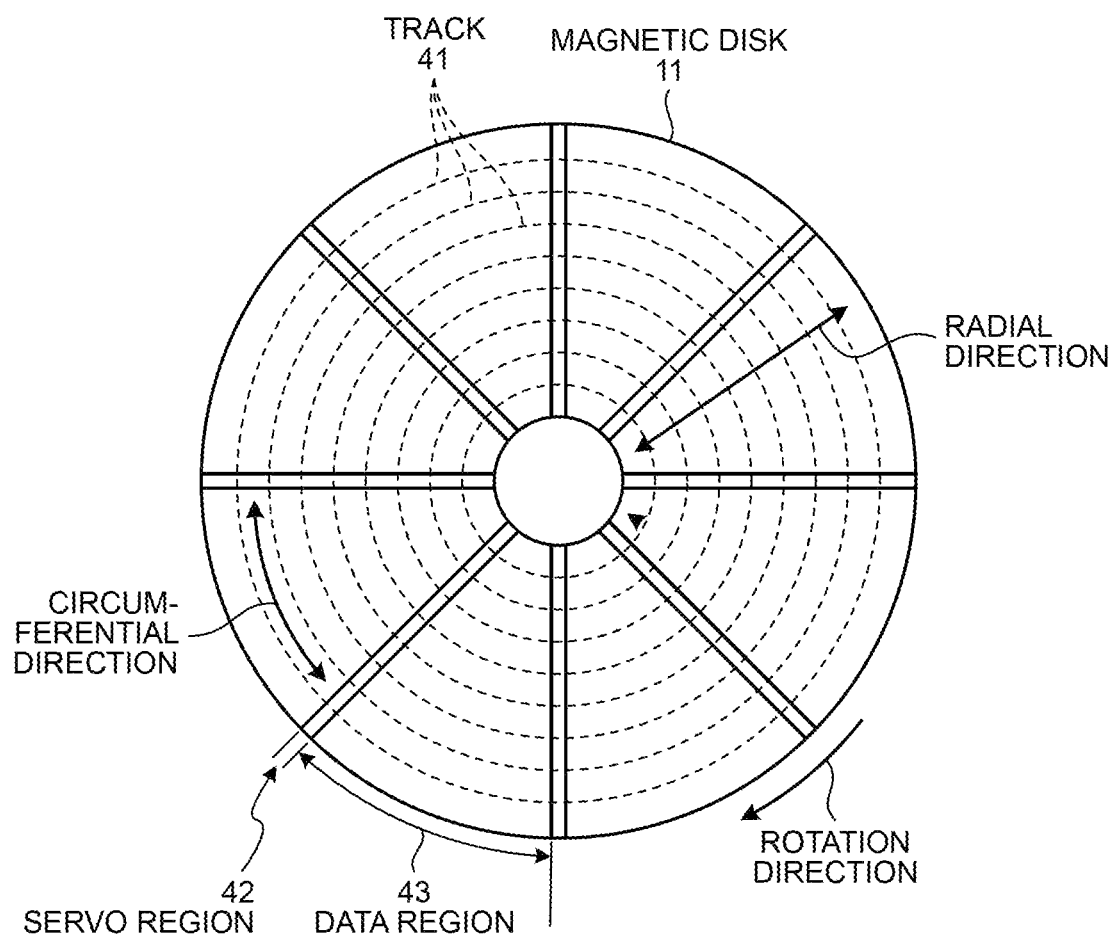
FIG. 2 is a schematic diagram illustrating an example of a configuration of a magnetic disk according to the first embodiment.

FIG. 2 is a schematic diagram illustrating an example of a configuration of the magnetic disk 11 according to the first embodiment. FIG. 2 illustrates an example of a rotation direction of the magnetic disk 11.

Servo information is written to the magnetic disk 11 by, for example, a servo writer or self-servo writing (SSW) in a manufacturing process. As an example of the arrangement of servo regions in which the servo information is written, radially arranged servo regions 42 are illustrated in FIG. 2.

The servo information includes sector/cylinder information, a burst pattern, an RRO bit, and the like. The sector/cylinder information can give a servo address (servo sector address) in a circumferential direction of the magnetic disk 11 and a position of a track (track number) set in the radial direction. The track number obtained from the sector/cylinder information is an integer value, and the burst pattern represents an offset amount after the decimal point using the track number as a reference.

The shape of the track is ideally a perfect circle. However, the servo track is distorted due to vibration or the like received at the time of writing the servo information. Therefore, the position of the track in the radial direction (radial position) set based on the burst pattern (more precisely, a combination of the sector/cylinder information and the burst pattern) may deviate from the radial position of a track 41 having the ideal shape. This positional deviation causes deterioration in positioning accuracy. This positional deviation is called RRO since the positional deviation is repeatedly generated in the same manner with one rotation of the magnetic disk (and the spindle motor) as a cycle. In the manufacturing process, correction information for correcting the positional deviations caused by the RRO is learned at a plurality of radial positions, and the correction information is written to the magnetic disk 11 as RRO bits. Then, at the time of using the magnetic disk device 1, when the magnetic head 22 is positioned on the target track, control to cancel the positional deviation caused by the RRO based on the RRO bits is performed.

Note that, in the example illustrated in FIG. 2, a data region 43 to which data can be written is provided between the servo regions 42. In the data region 43, a plurality of data sectors are continuously formed along each track 41. Data is written and read to and from each data sector by the magnetic head 22.

Hereinafter, a region divided by the servo region 42 on the track 41 is referred to as a servo sector SV. The servo sectors SV on one track 41 are respectively identified by identification numbers allocated in ascending order in which the magnetic head 22 passes with a predetermined circumferential position as a reference. The identification number is referred to as a servo sector number. In addition, the servo sector SV to which "x" (where x is an integer of 0 or more) is given as the servo sector number is referred to as a servo sector SV #x.

Figure 3:
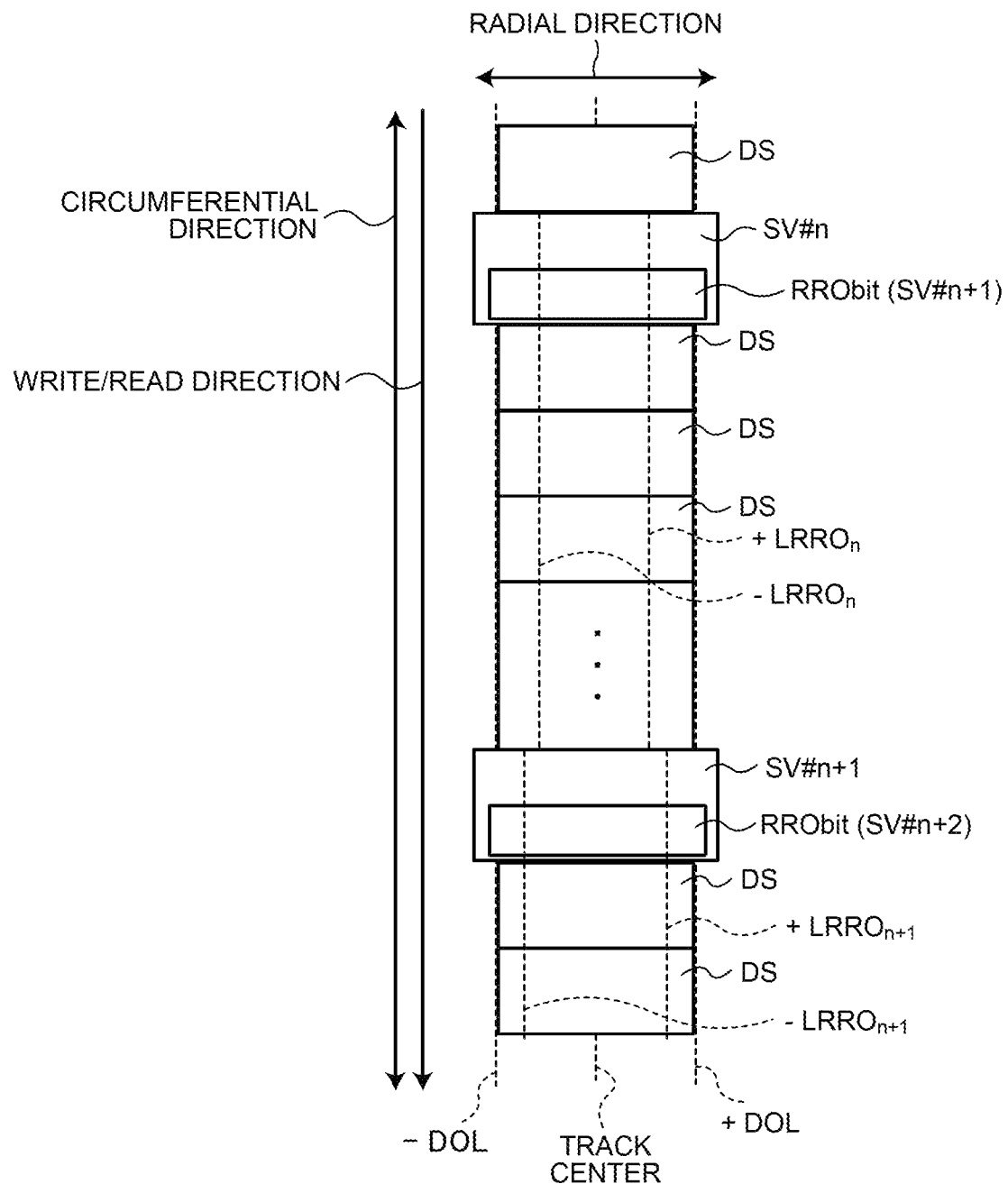
FIG. 3 is a diagram illustrating an example of storage positions of RRO bits according to the first embodiment.

FIG. 3 is a diagram illustrating an example of storage positions of RRO bits according to the first embodiment; In FIG. 3, a write/read direction is drawn in addition to the circumferential direction and the radial direction. The magnetic head 22 moves relative to the magnetic disk 11 by the rotation of the magnetic disk 11. The write/read direction is a direction in which data is written or read by the magnetic head 22 and is a direction opposite to the rotation direction of the magnetic disk 11.

When first data and second data are written along the write/read direction, and the first data is written in a region where data is read earlier than the second data, the direction toward the region of the first data as viewed from a region where the second data is written may be referred to as "before" the region where the second data is written. On the contrary, the direction toward the region of the second data as viewed from a region where the first data is written may be referred to as "after" the region where the first data is written. When the first region is focused on, in a case where "an immediately before second region" or "a second region arranged immediately before" is referred to, "an immediately before second region" or "a second region arranged immediately before" indicates the second region through which the magnetic head 22 passes lastly before the magnetic head 22 passes through the first region. When the first region is focused on, in a case where "an immediately after second region" or "a second region arranged immediately after" is referred to, "an immediately before second region" or "a second region arranged immediately before" indicates the second region through which the magnetic head 22 passes firstly after the magnetic head 22 passes through the first region.

In FIG. 3, servo sectors SV #n and #n+1 are illustrated as an example of the plurality of servo sectors SV formed on the track 41. A plurality of data sectors DS are arranged between the servo sector SV #n and the servo sector SV #n+1.

In the servo sector SV #n, an RRO bit related to the servo sector SV #n+1 which is the servo sector SV arranged immediately after the servo sector SV #n is recorded. The RRO bit related to the servo sector SV #n+1 is used for correction of the RRO in a section of the servo sector SV #n+1 to a servo sector SV #n+2 (not illustrated).

In the servo sector SV #n+1, an RRO bit related to the servo sector SV #n+2 which is the servo sector SV arranged immediately after the servo sector SV #n+1 is recorded. The RRO bit related to the servo sector SV #n+2 is used for correction of the RRO in a section of the servo sector SV #n+2 to the servo sector SV #n+3 (not illustrated).

In this manner, an RRO bit related to each servo sector SV is recorded in the servo sector SV arranged immediately before. Therefore, since the controller 30 can obtain in advance the RRO bit used for correction of the RRO in the section between the servo sectors SV, the correction using the corresponding RRO bit can be started from the time point the magnetic head 22 reaches the corresponding section.

The method for recording the RRO bit in each servo sector SV is not limited thereto. An RRO bit related to each servo sector SV may be recorded in another servo sector SV two or more before the servo sectors SV.

Hereinafter, a section of the servo sector SV #x to the servo sector SV #x+1 may be referred to as a servo section #x.

The RRO bit recorded in each servo sector SV includes a plurality of RRO correction amounts obtained at a plurality of radial positions different from each other.

More specifically, the controller 30 has a linear RRO correction function. The linear RRO correction function is a function of estimating a change in the RRO correction amount between the plurality of radial positions based on the plurality of RRO correction amounts obtained at the plurality of radial positions different from each other, and correcting a position of the magnetic head 22 based on the estimated change in the RRO correction amount. Hereinafter, an operation of estimating the change in the RRO correction amount by the linear RRO correction function is referred to as linear RRO estimation. In addition, each radial position where the plurality of RRO correction amounts serving as references used for the RRO correction amount estimation is obtained is referred to as a learning position.

Figure 4:
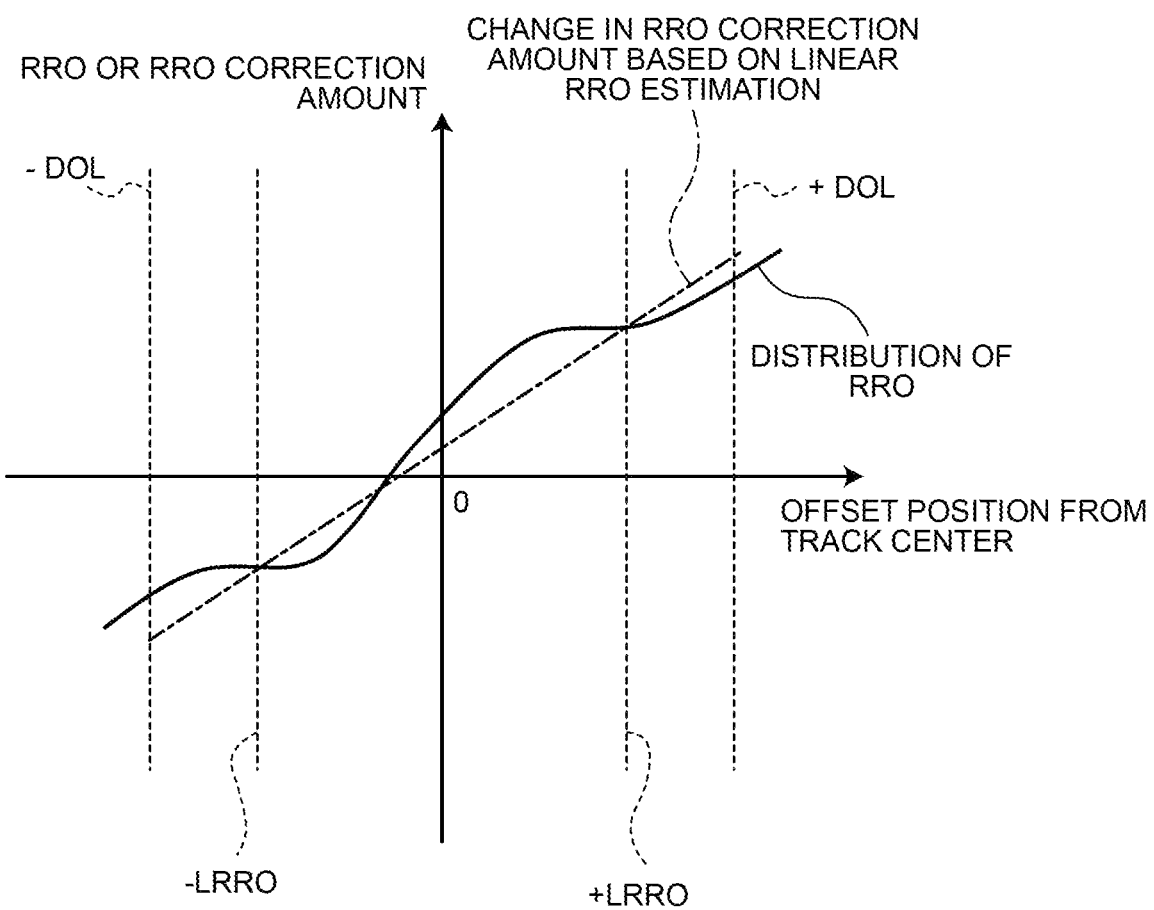
FIG. 4 is a graph for describing a linear RRO correction function according to the first embodiment.

FIG. 4 is a graph for describing a linear RRO correction function according to the first embodiment; In the drawing, the horizontal axis represents an offset position from a track center in the radial direction, and the vertical axis represents the RRO or the RRO correction amount. In the radial direction, one of the direction toward the outer periphery and the direction toward the inner periphery is defined as a positive direction, and the other is defined as a negative direction.

Data is written when the magnetic head 22 is in an on-track state. That is, the controller 30 determines whether the magnetic head 22 is in the on-track state and writes data by using the magnetic head 22 when the magnetic head 22 is in the on-track state.

Whether the magnetic head 22 is in the on-track state is determined based on a threshold with the track center set as a reference. The threshold used to determine the on-track state is referred to as a drift off level (DOL).

In the example illustrated in FIG. 4, one threshold line +DOL is set on a positive side with the track center as a reference, and another threshold line −DOL is set on a negative side with the track center as a reference. When the magnetic head 22 is positioned in a range of −DOL to +DOL, it is determined that the magnetic head 22 is in the on-track state. When the magnetic head 22 deviates from the range of −DOL to +DOL, it is determined that the magnetic head 22 is not in the on-track state, that is, the magnetic head 22 is in an off-track state. That is, the range of −DOL to +DOL can be regarded as a write permission range that is a range in which writing of data including the track center is permitted.

According to the linear RRO correction function, two learning positions are set in the range of −DOL to +DOL. In this example, one learning position +LRRO is set at a position offset to the positive side from the track center, and another learning position −LRRO is set at a position offset to the negative side from the track center.

The controller 30 obtains the RRO correction amounts at respective learning positions, that is, intersection points between the respective learning positions and a distribution of the RRO. The controller 30 regards a straight line connecting the intersection points between the respective learning positions and the distribution of the RRO as a change in the RRO correction amount in the range of −DOL to +DOL and obtains the RRO correction amount at a freely selected offset position in the range of −DOL to +DOL based on this straight line.

The controller 30 may perform the linear RRO estimation based on the RRO correction amounts obtained from three or more learning positions. Hereinafter, as an example, the controller 30 performs the linear RRO estimation based on the RRO correction amounts obtained from two learning positions.

In addition, in the first embodiment, as an example, it is assumed that a distance between the track center and one of two learning positions is equal to a distance between the track center and the other of two learning positions. The distance between the track center and the one of the two learning positions may not necessarily be equal to the distance between the track center and the other of the two learning positions. Further, both the two learning positions may be set on the positive side as viewed from the track center or may be set on the negative side as viewed from the track center.

The two learning positions can be different at different locations in the magnetic disk 11. In FIG. 3, one threshold line −DOL and another threshold line +DOL are illustrated, and two learning positions −LRRO and +LRRO are illustrated between −DOL and +DOL. Then, two learning positions −LRRO$_n$ and +LRRO$_n$ in the servo sector SV #n (more specifically, the servo section #n) are different from the two learning positions −LRRO$_{n+1}$ and +LRRO$_{n+1}$ in the servo sector SV #n+1 (more specifically, the servo section #n+1). That is, in the example illustrated in FIG. 3, pairs of learning positions can be individually set in units of servo sectors SV.

Note that pairs of positions common to the track 41, the plurality of tracks 41, the plurality of servo sectors SV arranged in the radial direction, or the plurality of servo sectors SV arranged in the circumferential direction may be set as the two learning positions.

Hereinafter, the two learning positions where the two RRO correction amounts used by the linear RRO correction function are obtained may be referred to as a pair of learning positions or a set of learning positions. In addition, two candidate learning positions set for searching for the pair of learning positions may be referred to as a pair of candidate learning positions or a set of candidate learning positions. Details of the candidate learning position are described below.

Here, a technique to be compared with the first embodiment is described. The technique to be compared with the first embodiment is referred to as a comparative example. According to the comparative example, a plurality of pairs of candidate learning positions are prepared, and the change in the RRO correction amount is estimated for each pair of candidate learning positions. Then, the sum of squares of the residual error is calculated as the evaluation value for each pair of candidate learning positions. The residual error is a difference between the estimated RRO correction amount and the distribution of the RRO obtained in the range of −DOL to +DOL. The pair of candidate learning positions having a minimum evaluation value is determined as the pair of learning positions.

According to the comparative example, the RRO correction amount closest to the distribution of the RRO in the range of −DOL to +DOL is obtained. However, in the comparative example, a case where the residual error becomes large near −DOL or +DOL cannot be excluded.

When the residual error is large near −DOL or +DOL, there is a high risk that the position of the magnetic head 22 deviates from the range of −DOL to +DOL. When the position of the magnetic head 22 deviates from the range of −DOL to +DOL at the time of writing, the writing is prohibited, and the writing is retried after the magnetic disk 11 makes one rotation. Therefore, the time required for writing increases, and the performance of writing deteriorates.

Furthermore, when the position of the magnetic head 22 deviates from the range of −DOL to +DOL at the time of writing, another piece of data may be overwritten onto data on an adjacent track. In this case, it is necessary to rewrite the data on the adjacent track. Therefore, the performance of the writing deteriorates.

In the first embodiment, the residual error or the amount corresponding to the residual error is weighted according to the offset position from the track center, and the sum of squares of the weighted residual error or the amount corresponding to the residual error is used as the evaluation value. By devising a weighting method, it is possible to suppress the possibility that the position of the magnetic head 22 deviates from the range of −DOL to +DOL.

The weighting according to the offset position from the track center is executed by using, for example, a weight function. Some examples of the weight function are described. The weight function may be defined as a mathematical expression or may be prepared as data of a table configuration.

Figure 5B:
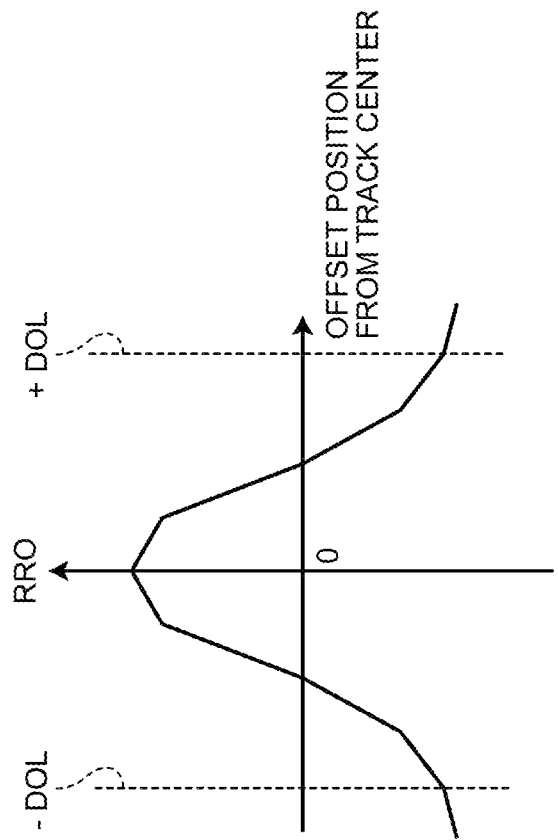
FIGS. 5A and 5B are diagrams illustrating an example of a weight function according to the first embodiment.
Figure 5A:
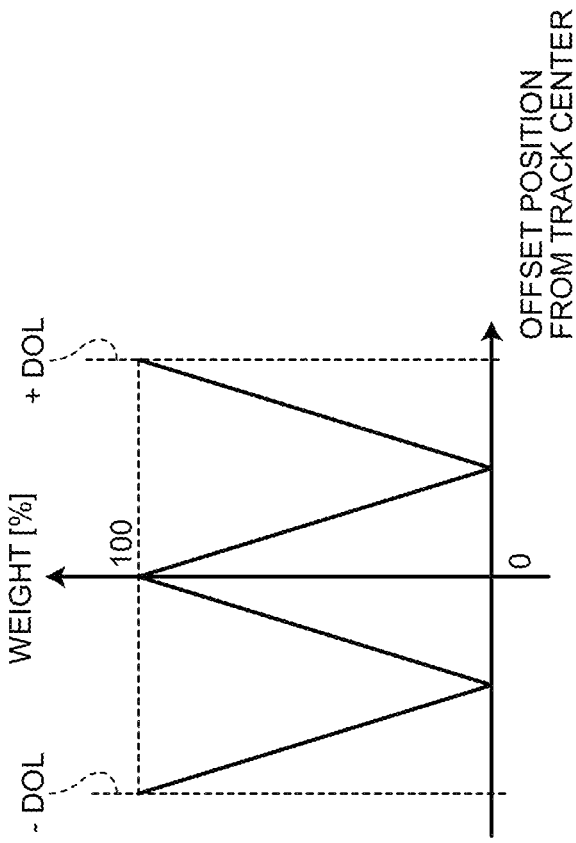

FIGS. 5A and 5B are diagrams illustrating an example of a weight function according to the first embodiment;

For example, as illustrated in FIG. 5A, a weight function having a shape of "W" in which the weight becomes the maximum at each offset position of 0, −DOL, and +DOL is applicable. According to this weight function, not only the residual error can be suppressed near −DOL or +DOL, but also the residual error can be suppressed near the track center.

For example, in a case where an absolute value of the RRO is large in 0, −DOL, and +DOL as illustrated in FIG. 5B, it is possible to uniformly suppress the residual error in the range of −DOL to +DOL by applying the weighting function illustrated in FIG. 5A.

FIGS. 6A and 6B are diagrams illustrating another example of the weight function according to the first embodiment;

For example, as illustrated in FIG. 6A, a weight function having a shape of "V" in which the weight is maximum at each position of −DOL and +DOL and the weight is 0 at the track center is applicable. According to this weight function, the residual error can be suppressed near −DOL or +DOL without excessively suppressing the residual error near the track center.

For example, in a case where the absolute value of the RRO is large in −DOL and +DOL and the absolute value of the RRO is small near the track center as illustrated in FIG. 6B, it is possible to uniformly suppress the residual error in the range of −DOL to +DOL by applying the weighting function illustrated in FIG. 6A.

FIGS. 7A and 7B are diagrams illustrating still another example of the weight function according to the first embodiment;

For example, as illustrated in FIG. 7A, a weight function having a shape close to "U" in which the weight is maximum at each position of −DOL and +DOL, and the weight is 0 in a certain range around the track center is applicable. According to this weight function, the residual error can be suppressed near-DOL or +DOL without excessively suppressing the residual error in the above-described range near the track center.

For example, in a case where the absolute value of the RRO is large in −DOL and +DOL, and the absolute value of the RRO is small in the above-described range near the track center as illustrated in FIG. 7B, it is possible to uniformly suppress the residual error in the range of −DOL to +DOL by applying the weighting function illustrated in FIG. 7A.

A common weight function may be applied to the entire surface of the magnetic disk 11, or the weight function may be individually set according to the position in the magnetic disk 11. In the first embodiment, as an example, a weight function is individually set for each combination of a zone and the circumferential position.

The zone is a minimum unit in which a recording density can be individually set. The recording surface of the magnetic disk 11 is divided into a plurality of zones in the radial direction, and the track density in the radial direction and the recording density in the circumferential direction are set for each zone.

Here, the circumferential position is specified by the servo sector number. That is, in one zone, one weight function is commonly used for the plurality of servo sectors SV respectively belonging to the different tracks 41 having a common servo sector number.

Hereinafter, a region determined by the combination of the zone and the circumferential position (that is, the servo sector number) is referred to as a unit region. Note that an example of the unit region that is a region in which the weight function is individually set is not limited thereto. Each servo sector, each zone, or each track may be set as the unit region.

In addition, the distribution of the RRO in the range of −DOL to +DOL is referred to as an offset RRO.

The RRO is a disturbance and thus cannot be directly observed. On the other hand, an error between a target orbit of the magnetic head 22 and an orbit of an actual position of the magnetic head 22 can be observed. The error between the target orbit of the magnetic head 22 and the actual position of the magnetic head 22 is also referred to as a repeatable position error (RPE). The controller 30 measures the RPE and estimates the RRO by dividing the measured RPE by the sensitivity characteristic of the positioning control of the magnetic head 22. In the present specification, measuring the RRO means measuring the RPE and estimating the RRO based on the measured RPE.

Figure 8:
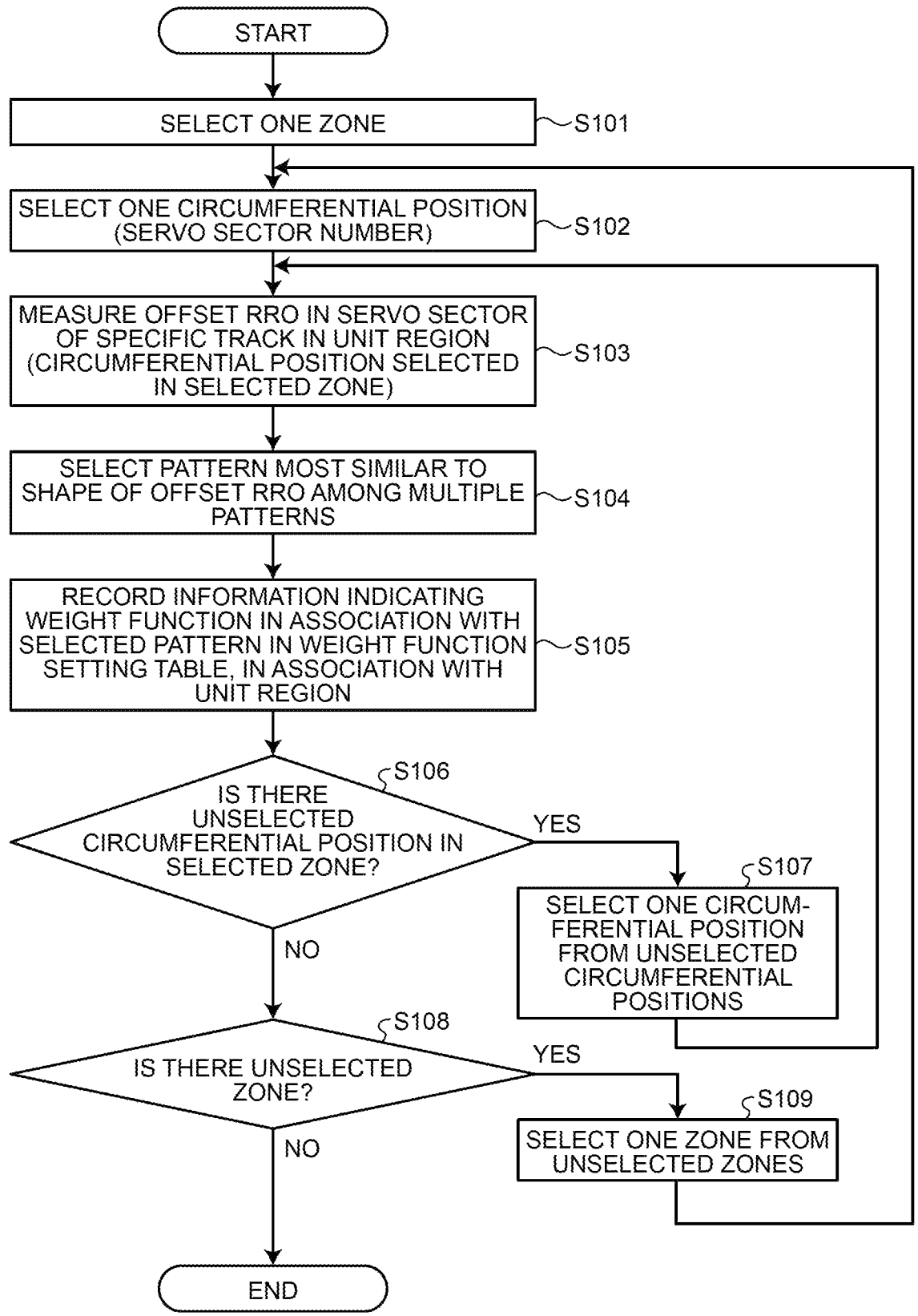
FIG. 8 is a flowchart illustrating an example of a procedure of setting the weight function for each unit region according to the first embodiment.

FIG. 8 is a flowchart illustrating an example of a procedure of setting the weight function for each unit region according to the first embodiment;

The procedure illustrated in FIG. 8 is executed, for example, in one or a plurality of small number of magnetic disk devices 1 sampled from a large number of magnetic disk devices 1 of the same type. Then, the weight function for each unit region set by the procedure illustrated in FIG. 8 is commonly used, for example, in the large number of magnetic disk devices 1 of the same type. In addition, for example, a firmware program for manufacturing is installed in the magnetic disk device 1, and some or all of the procedures illustrated in FIG. 8 are implemented by the processor 26 controlling the magnetic disk device 1 according to the firmware program for manufacturing.

First, the processor 26 selects one zone (S101). Then, the processor 26 selects one circumferential position, that is, the servo sector number (S102).

The processor 26 measures the offset RRO in the servo sector SV of the specific track 41 among the plurality of servo sectors SV that configures the unit region determined by the selected zone and the selected circumferential position (S103). The offset RRO in the servo sector SV is the offset RRO of the servo sector SV, the servo section immediately after the servo sector SV, or both thereof. Note that the specific track 41 can be freely set by a manufacturer.

The processor 26 selects a pattern most similar to a shape of the offset RRO among the plurality of patterns (S104). Then, the processor 26 records information indicating the weight function in association with the selected pattern, in association with the unit region (S105).

For example, the pattern of the offset RRO illustrated in FIG. 5B, the pattern of the offset RRO illustrated in FIG. 6B, and the pattern of the offset RRO illustrated in FIG. 7B are prepared in advance. Then, the weight function illustrated in FIG. 5A is associated with the pattern of the offset RRO illustrated in FIG. 5B, the weight function illustrated in FIG. 6A is associated with the pattern of the offset RRO illustrated in FIG. 6B, and the weight function illustrated in FIG. 7A is associated with the pattern of the offset RRO illustrated in FIG. 7B.

In S104, the processor 26 determines which pattern of the pattern of the offset RRO illustrated in FIG. 5B, the pattern of the offset RRO illustrated in FIG. 6B, and the pattern of the offset RRO illustrated in FIG. 7B is most similar to the offset RRO obtained by the processing of S103. Then, in S105, the processor 26 specifies the weight function associated with the pattern most similar to the offset RRO obtained by the processing of S103 and records the specified weight function.

In S104, the method for selecting a pattern similar to the shape of the offset RRO among the plurality of patterns is not limited to a specific method. For example, when the offset RRO is input, the processor 26 may implement the processing of S104 by using a trained neural network model configured to output information indicating a pattern most similar to the input offset RRO among the plurality of patterns.

The manufacturer may display the shape of the offset RRO obtained by the processing of S103 on a predetermined display device, and the manufacturer may select one of the plurality of patterns after visually confirming the shape of the offset RRO via the display device.

In S105, the processor 26 records information indicating the weight function in a predetermined table. This table is referred to as a weight function setting table.

FIG. 9 is a diagram illustrating an example of a data configuration of a weight function setting table according to the first embodiment. As illustrated in the drawing, the weight function setting table includes an entry for each unit region. Then, in each entry, a pointer indicating a storage position of the weight function is recorded as an example of information indicating the weight function. That is, a group of weight functions is stored in a predetermined area (for example, in the RAM 27). The pointer as the information indicating the weight function is an address of a position where the weight function is stored. Note that the information indicating the weight function is not limited to the pointer indicating the storage position of the weight function.

The description returns to FIG. 8.

After the processing of S105, the processor 26 determines whether there is an unselected circumferential position in the selected zone (S106). When there is the unselected circumferential position in the selected zone (S106: Yes), the processor 26 selects one circumferential position from the unselected circumferential positions (S107) and executes the series of pieces of processing from S103 again.

When there is no unselected circumferential position in the selected zone (S106: No), the processor 26 determines whether there is an unselected zone (S108). When there is the unselected zone (S108: Yes), the processor 26 selects one zone from the unselected zones (S109) and executes the series of pieces of processing from S102 again.

When there is no unselected zone (S108: No), the operation of setting the weight function for each unit region is completed.

In each magnetic disk device 1, after the servo information except for the RRO bit is written, the processor 26 controls an operation of recording the RRO bit based on the firmware program for manufacturing.

Figure 10:
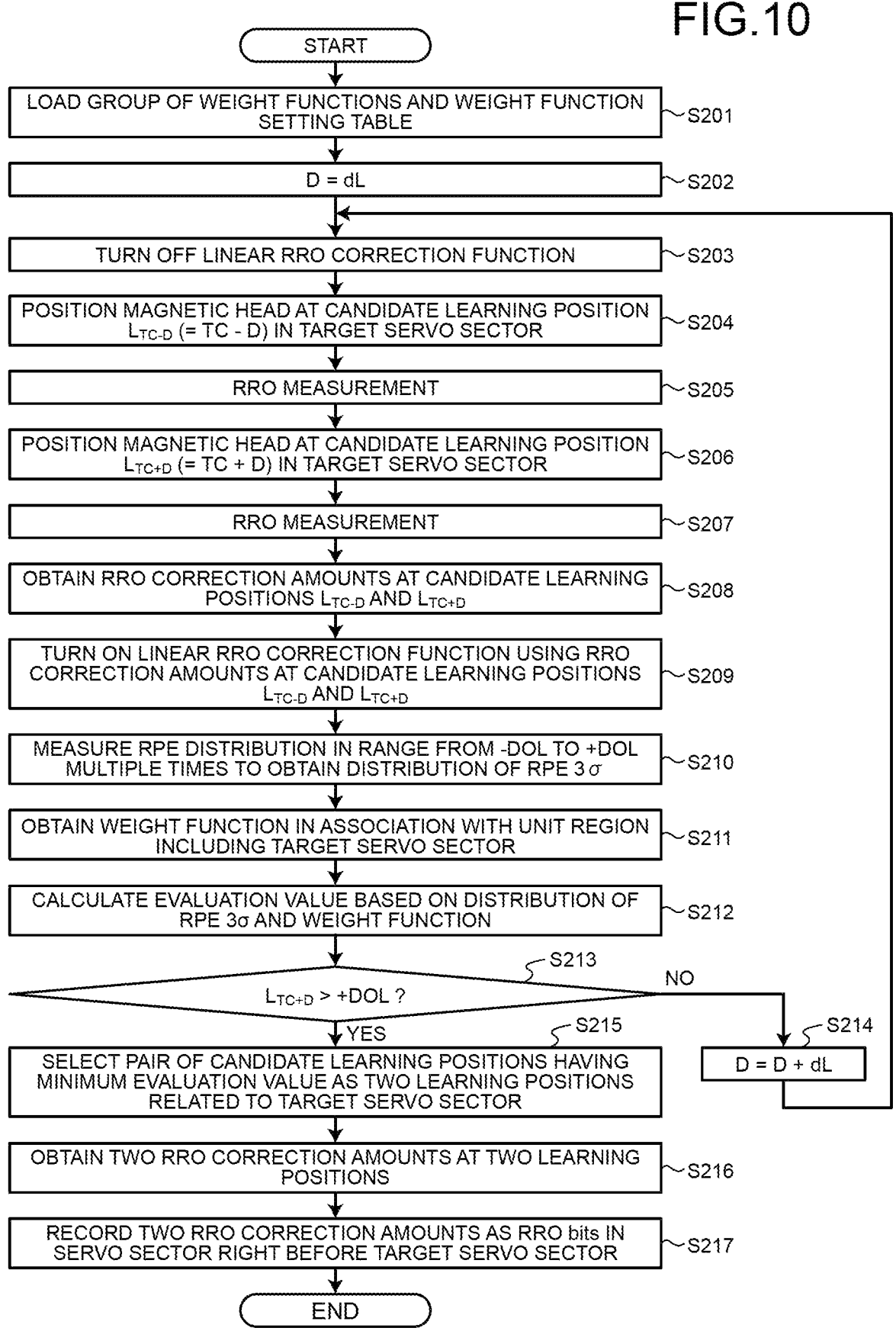
FIG. 10 is a flowchart illustrating an example of an operation of recording RRO bits on the magnetic disk according to the first embodiment.

FIG. 10 is a flowchart illustrating an example of an operation of recording the RRO bits on the magnetic disk 11 according to the first embodiment. Here, as an example, an operation of using one servo sector SV as a target and recording an RRO bit related to the target servo sector SV (hereinafter, referred to as the target servo sector SV) is described.

In addition, 3σ of the RPE, that is, the degree of variation in the residual error is used as an example of the residual error or the amount corresponding to the residual error, which is weighted by the weight function and used for the calculation of the evaluation value. The 3σ of the RPE is expressed as RPE 3σ.

First, the processor 26 obtains the group of weight functions and the weight function setting table and loads the group of weight functions and the weight function setting table into, for example, the RAM 27 (S201).

The processor 26 substitutes a predetermined step width dL for a variable D (S202). Then, the processor 26 turns off the linear RRO correction function (S203).

Here, a pair of a position $L_{TC-D}$ separated from the track center TC by D to the negative side and a position $L_{TC+D}$ separated from the track center TC by D to the positive side is set as the pair of candidate learning positions, and a plurality of pairs of candidate learning positions are set by adding D by dL. Therefore, S202 corresponds to processing of setting one pair from the plurality of pairs of candidate learning positions.

The pair of the candidate learning position $L_{TC-D}$ and the candidate learning position $L_{TC+D}$ is an example of the first position set. A plurality of pairs in which different values are set as D (pairs of the candidate learning positions $L_{TC-D}$ and the candidate learning positions $L_{TC+D}$) are examples of the plurality of first position sets.

The processor 26 positions the magnetic head 22 at the candidate learning position $L_{TC-D}$ in the target servo sector SV (S204) and measures the RRO (S205). That is, the processor 26 measures the RPE when the magnetic head 22 passes through the target servo sector SV and estimates the RRO in the target servo sector SV by dividing the measured RPE by the sensitivity characteristic of the positioning control of the magnetic head 22.

The processor 26 positions the magnetic head 22 at the candidate learning position $L_{TC+D}$ in the target servo sector (S206) and measures the RRO (S207). That is, the processor 26 measures the RPE when the magnetic head 22 passes through the target servo sector SV and estimates the RRO in the target servo sector SV by dividing the measured RPE by the sensitivity characteristic of the positioning control of the magnetic head 22.

The processor 26 obtains the RRO correction amounts at the candidate learning positions $L_{TC-D}$ and $L_{TC+D}$ based on the RRO obtained by the processing of S205 and S207 (S208). Then, the processor 26 turns on the linear RRO correction function using the RRO correction amounts at the candidate learning positions $L_{TC-D}$ and $L_{TC+D}$ (S209).

The processor 26 measures a distribution of the RPE in the range of −DOL to +DOL using the track center as a reference a plurality of times to obtain a distribution of the RPE 3σ in the range of −DOL to +DOL (S210).

Figure 11:
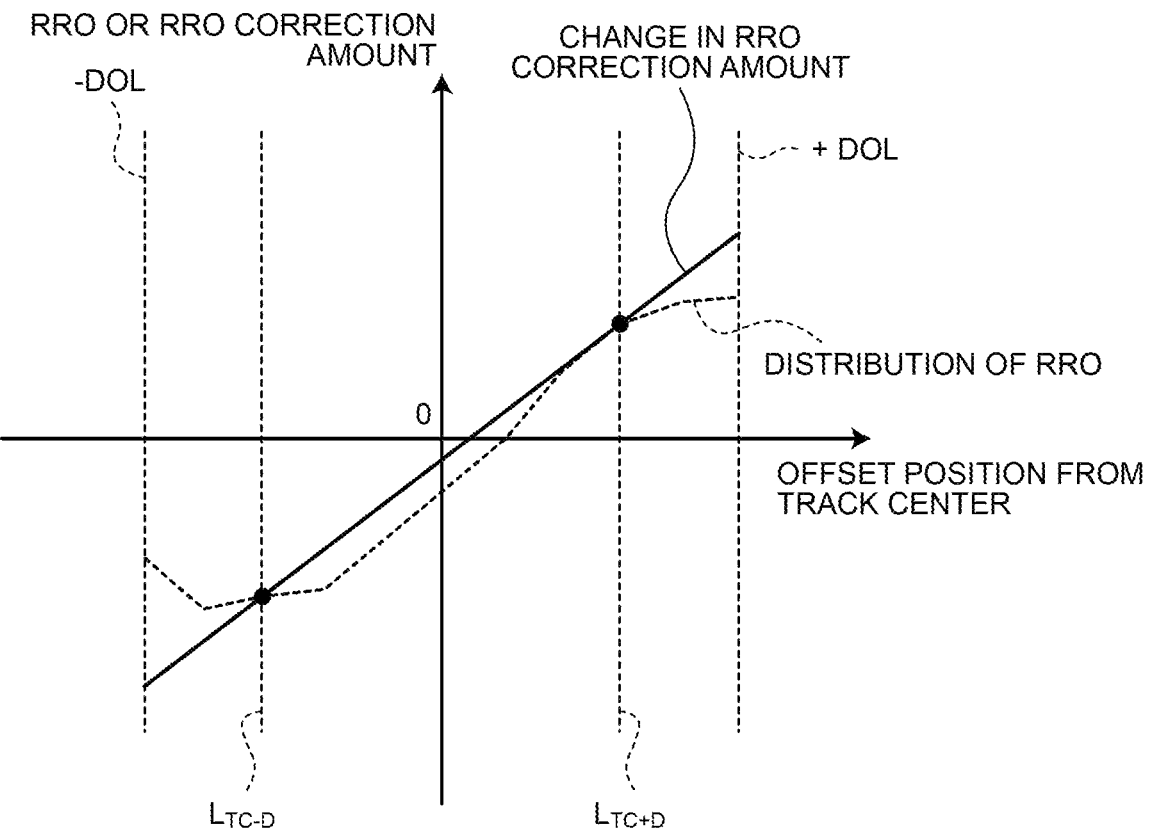
FIG. 11 is a diagram illustrating a specific example of processing of S208 to S210 according to the first embodiment.

FIG. 11 is a diagram illustrating a specific example of the processing of S208 to S210. In the drawing, the horizontal axis represents an offset position from a track center in the radial direction, and the vertical axis represents the RRO or the RRO correction amount.

The processor 26 obtains the RRO at the candidate learning positions $L_{TC-D}$ and $L_{TC+D}$ (see two round points in FIG. 11) by the processing of S205 and S207. Then, the processor 26 sets the RRO at the candidate learning position $L_{TC-D}$ as the RRO correction amount at the candidate learning position $L_{TC-D}$, sets the RRO at the candidate learning position $L_{TC+D}$ as the RRO correction amount at the candidate learning position $L_{TC+D}$, and connects the RRO correction amount at the candidate learning position $L_{TC-D}$ and the RRO correction amount at the candidate learning position $L_{TC+D}$ by a straight line (see a solid line in FIG. 11).

Then, the processor 26 measures the RPE when the magnetic head 22 passes through the target servo sector SV a plurality of times for each of the plurality of positions in the range of −DOL to +DOL under the linear RRO correction function in which the straight line is regarded as the change in the RRO correction amount in the range of −DOL to +DOL.

Figure 12:
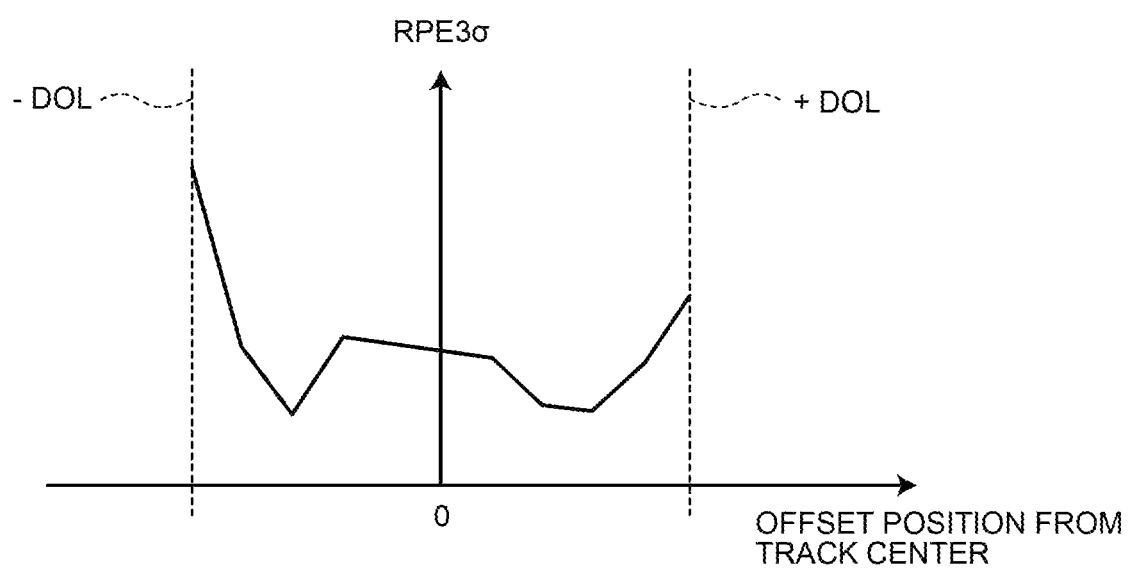
FIG. 12 is a graph plotting RPE 3σ obtained by processing of S210 of the first embodiment.

In S210, the processor 26 calculates 3σ of the obtained RPE for each of the plurality of positions in the range of −DOL to +DOL. As a result, for example, the distribution of the RPE 3σ as illustrated in FIG. 12 is obtained. FIG. 12 is a graph plotting 3σ of the RPE obtained for each of the plurality of positions in the range of −DOL to +DOL.

The description returns to FIG. 10.

Subsequent to S210, the processor 26 obtains the weight function in association with the unit region including the target servo sector SV from the weight function setting table (S211).

The processor 26 calculates an evaluation value related to the candidate learning positions $L_{TC-D}$ and $L_{TC+D}$ based on the distribution of the RPE 3σ and the obtained weight function (S212).

For example, when the offset position is x, the RPE 3σ at the offset position x is RPE 3σ(x), and the weight function is f(x), the processor 26 obtains an evaluation value $E_D$ related to the candidate learning positions $L_{TC-D}$ and $L_{TC+D}$ by using Formula (1).

$$E_D = \Sigma(\text{RPE } 3\sigma(x)f(x))^2, -\text{DOL} < x < +\text{DOL} \quad (1)$$

Subsequently, the processor 26 determines whether $L_{TC+D}$ exceeds +DOL (S213). When $L_{TC+D}$ does not exceed +DOL (S213: No), the processor 26 increases the value of D by dL (S214) and executes the processing from S203 again.

When $L_{TC+D}$ exceeds +DOL (S213: Yes), the processor 26 selects the candidate learning positions $L_{TC-D}$ and $L_{TC+D}$ having the minimum evaluation value as the two learning positions related to the target servo sector SV (S215).

Note that the two learning positions set by the processing of S215 are an example of a second position set.

The processor 26 obtains two RRO correction amounts at two learning positions (S216). The processor 26 records two RRO correction amounts as the RRO bits in the servo sector SV right before the target servo sector SV (S217). Then, the operation of recording the RRO bits related to the target servo sector SV is completed.

Note that, in the above description, it is assumed that the distance from one candidate learning position that configures the pair of candidate learning positions to the track center is equal to the distance from another candidate learning position that configures the pair of candidate learning positions to the track center. The distance from one candidate learning position that configures the pair of candidate learning positions to the track center may be different from the distance from another candidate learning position that configures the pair of candidate learning positions to the track center.

As described above, according to the first embodiment, the processor 26 sets the plurality of sets of candidate learning positions, which are sets each including a plurality of positions at radial positions on the track 41, by the processing of S214, for example, in the loop processing from S203 to S214. Then, for example, by repeating the loop processing from S203 to S214, the processor 26 obtains the distribution of the RPE 3σ as the amount corresponding to the residual error when the positional deviation due to the RRO is corrected by using the RRO correction amount at each candidate learning position included in one set, for each set of candidate learning positions. Then, the processor 26 performs an operation of weighting the distribution of the RPE 3σ according to the offset position and calculating the evaluation value based on the weighted distribution of the RPE 3σ by the processing of S212, for example, in the loop processing from S203 to S214, for each set of candidate learning positions. Then, for example, by the processing of S215, the processor 26 selects a set of learning positions from the plurality of sets of candidate learning positions based on the evaluation value obtained for each set of candidate learning positions. Then, for example, by the processing of S216 to S217, the processor 26 records the RRO correction amounts at the respective learning positions in the target servo sector.

In this manner, since the distribution of the amounts corresponding to the residual errors is weighted according to the offset position, and the set of learning positions is selected based on the weighted distribution, the residual error near −DOL or +DOL can be suppressed by devising the weighting method. As a result, the possibility that the position of the magnetic head 22 deviates from the range of −DOL to +DOL is suppressed, and the occurrence of retry of writing and the occurrence of overwriting on the data on the adjacent track are suppressed. Therefore, the performance of the writing is improved. That is, the magnetic disk device 1 having high performance can be obtained.

According to the first embodiment, the RPE 3σ, which is a variation in the residual error, is used as an example of the amount corresponding to the residual error. The amount corresponding to the residual error applicable in the first embodiment is not limited thereto. For example, the amount corresponding to the residual error may be an average value of the RPE measured a plurality of times in the target servo sector in the processing of S210. In addition, the residual error may be used instead of the amount corresponding to the residual error. For example, in the processing of S210, the distribution of the RPE may be measured only once in the target servo sector, and in the subsequent processing, the distribution of the RPE may be used instead of the distribution of the RPE 3σ.

In addition, according to the first embodiment, the distribution of the RPE is measured a plurality of times for the target servo sector, and thus, the distribution of the RPE 3σ is obtained. In the process of S210, the processor 26 may measure the distribution of the RPE for a plurality of servo sectors including the target servo sector, obtain the distribution of the RPE 3σ or the distribution of the average values of the RPE based on the plurality of obtained distributions of the RPE, and use the distribution of the RPE 3σ or the distribution of the average values of the RPE for the subsequent processing.

Further, in the processing of S210, the processor 26 may measure the distribution of the RPE for all the servo sectors in the track 41 including the target servo sector, obtain the distribution of the RPE 3σ or the distribution of the average values of the RPE based on the plurality of obtained distributions of the RPE, and use the distribution of the RPE 3σ or the distribution of the average values of the RPE for the subsequent processing.

Further, in the processing of S210, the processor 26 may measure the distribution of the RPE for all the servo sectors in the unit region including the target servo sector, obtain the distribution of the RPE 3σ or the distribution of the average values of the RPE based on the plurality of obtained distributions of the RPE, and use the distribution of the RPE 3σ or the distribution of the average values of the RPE for the subsequent processing.

Further, in the processing of S210, the processor 26 may measure the distribution of the RPE for all the servo sectors in the zone including the target servo sector, obtain the distribution of the RPE 3σ or the distribution of the average values of the RPE based on the plurality of obtained distributions of the RPE, and use the distribution of the RPE 3σ or the distribution of the average values of the RPE for the subsequent processing.

Furthermore, according to the first embodiment, the processor 26 performs weighting with the maximum weight at the respective offset positions of −DOL and +DOL that are ends of the range of −DOL to +DOL as the write permission range, for example, based on the weight functions as illustrated in FIG. 5A, FIG. 6A, and FIG. 7A.

As a result, it is possible to suppress the residual error near −DOL or +DOL.

Furthermore, according to the first embodiment, the processor 26 performs weighting with the maximum weight at the track center, for example, based on the weight function as illustrated in FIG. 5A.

As a result, even if the RRO (more precisely, the absolute value of the RRO) is large at the track center, the residual errors can be uniformly suppressed including the residual errors near −DOL or +DOL.

Furthermore, according to the first embodiment, the processor 26 may perform weighting with the minimum weight at a predetermined position between the track center and −DOL and a predetermined position between the track center and +DOL, for example, based on the weight function as illustrated in FIG. 5A.

Furthermore, according to the first embodiment, the processor 26 performs weighting with the minimum weight at the track center, for example, based on the weight function as illustrated in FIG. 6A.

As a result, when the RRO (more precisely, the absolute value of the RRO) is small at the track center, the residual errors can be uniformly suppressed including the residual errors near −DOL or +DOL.

Furthermore, according to the first embodiment, the processor 26 performs weighting with the minimum weight at a predetermined range including the track center, for example, based on the weight function as illustrated in FIG. 7A.

As a result, when the RRO (more precisely, the absolute value of the RRO) is small in a predetermined range including the track center, the residual errors can be uniformly suppressed including the residual errors near −DOL or +DOL.

Second Embodiment

Measurement of the distribution of the RPE is obtained by measuring the RPE a plurality of times by varying measurement positions in the radial direction. In the first embodiment, the distribution of the RPE is measured for each set of candidate learning positions. Therefore, determination of the set of learning positions requires RPE measurement a very large number of times.

In the second embodiment, a method for suppressing the number of times of measurement of the RPE required to determine the set of learning positions is described. In the second embodiment, matters different from those in the first embodiment are described. The same matters as those in the first embodiment are not described or are briefly described.

Figure 13:
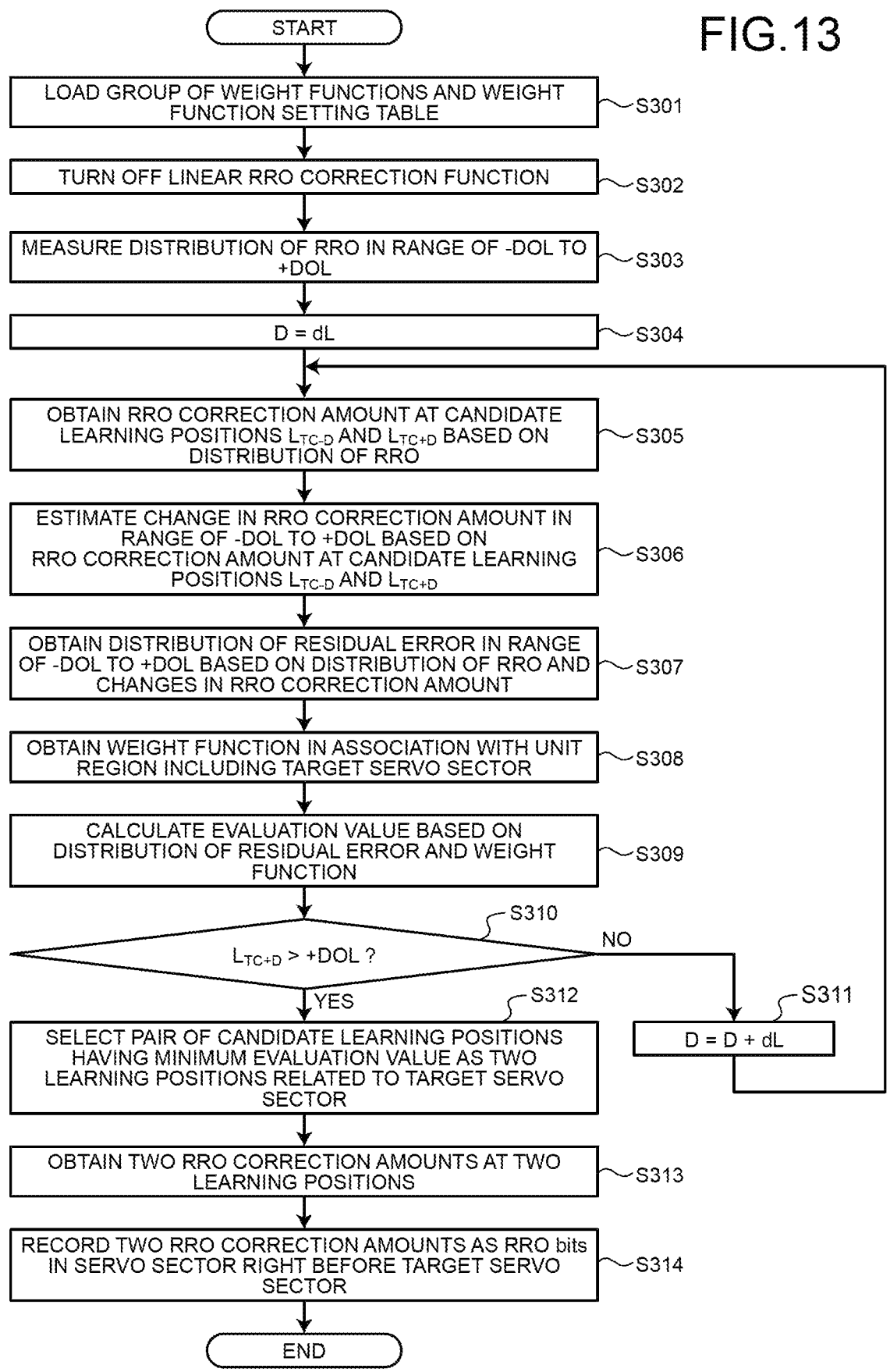
FIG. 13 is a flowchart illustrating an example of an operation of recording RRO bits on a magnetic disk according to a second embodiment.

FIG. 13 is a flowchart illustrating an example of an operation of recording the RRO bits on the magnetic disk 11 according to the second embodiment. Here, as an example, an operation of using one servo sector SV as a target and recording an RRO bit related to the target servo sector SV (hereinafter, referred to as the target servo sector SV) is described.

First, the processor 26 obtains the group of weight functions and the weight function setting table and loads the group of weight functions and the weight function setting table into, for example, the RAM 27 (S301).

Subsequently, the processor 26 turns off the linear RRO correction function (S302) and measures the distribution of the RRO when the magnetic head 22 passes through the target servo sector SV in the range of −DOL to +DOL (S303).

The processor 26 substitutes the predetermined step width dL for the variable D (S304).

The processor 26 obtains the RRO correction amounts at the candidate learning positions $L_{TC-D}$ and $L_{TC+D}$ based on the distribution of the RRO (S305). The processor 26 estimates a change in the RRO correction amount in the range of −DOL to +DOL based on the RRO correction amount at the candidate learning positions $L_{TC-D}$ and $L_{TC+D}$ (S306). The processor 26 obtains the distribution of the residual errors in the range of −DOL to +DOL based on the distribution of the RRO and the change in the RRO correction amount in the range of −DOL to +DOL (S307).

Figure 14:
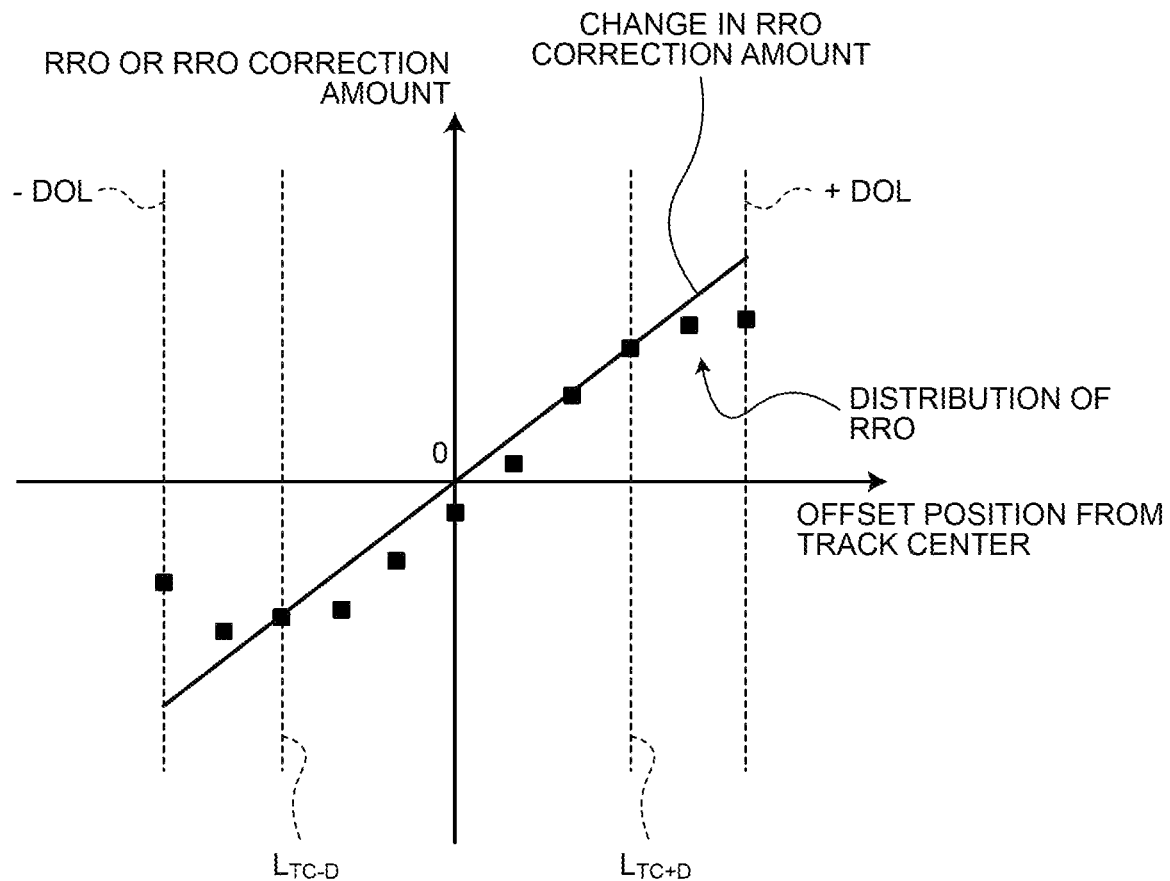
FIG. 14 is a diagram illustrating a specific example of processing of S303 to S307 according to the second embodiment.

FIG. 14 is a diagram illustrating a specific example of the processing of S303 to S307. In the drawing, the horizontal axis represents an offset position from a track center in the radial direction, and the vertical axis represents the RRO or the RRO correction amount.

A plurality of points of the rectangular shape indicate the distribution of the RRO obtained by the processing of S303. In the example illustrated in FIG. 14, the RRO is measured for each candidate learning position obtained by varying the variable D by the step width dL. That is, the processor 26 measures the RPE for each of the plurality of points set to be separated by the step width dL in the range of −DOL to +DOL and divides the RPE at each point by the sensitivity characteristic of the positioning control of the magnetic head 22 to obtain the RRO at each point.

In S305, the processor 26 sets the RRO at the candidate learning position $L_{TC-D}$ as the RRO correction amount at the candidate learning position $L_{TC-D}$, and sets the RRO at the candidate learning position $L_{TC+D}$ as the RRO correction amount at the candidate learning position $L_{TC+D}$, and connects the RRO correction amount at the candidate learning position $L_{TC-D}$ and the RRO correction amount at the candidate learning position $L_{TC+D}$ with a straight line (see a straight line in FIG. 14). The processor 26 regards the straight line as the change in the RRO correction amount in the range of −DOL to +DOL.

Figure 15:
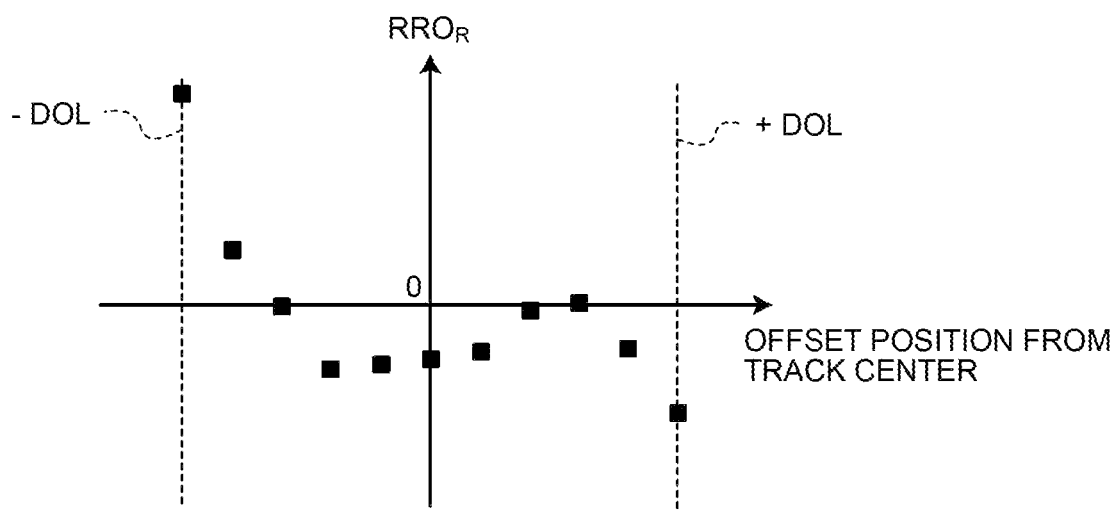
FIG. 15 is a graph plotting a residual error obtained by processing of S307 according to the second embodiment.

Then, the processor 26 obtains a difference between the RRO and the change in the RRO correction amount at each point where the RRO is obtained as a residual error at each point. FIG. 15 is a graph plotting the residual error at each point.

The description returns to FIG. 13.

Subsequent to S307, the processor 26 obtains the weight function in association with the unit region including the target servo sector SV from the weight function setting table (S308).

The processor 26 calculates an evaluation value related to the candidate learning positions $L_{TC-D}$ and $L_{TC+D}$ based on the distribution of the residual errors and the obtained weight function (S309).

For example, when the offset position is x, the residual error at the offset position x is $RRO_R(x)$, and the weight function is f(x), the processor 26 obtains the evaluation value $E_D$ related to the candidate learning positions $L_{TC-D}$ and $L_{TC+D}$ by using Formula (2).

$$E_D = \Sigma(RRO_R(x)f(x))^2, -DOL < x < +DOL \quad (2)$$

The processor 26 determines whether $L_{TC+D}$ exceeds +DOL (S310). When $L_{TC+D}$ does not exceed +DOL (S310: No), the processor 26 increases the value of D by dL (S311) and executes the processing from S305 again.

When $L_{TC+D}$ exceeds +DOL (S310: Yes), the processor 26 selects the candidate learning positions $L_{TC-D}$ and $L_{TC+D}$ having the minimum evaluation value as the two learning positions related to the target servo sector SV (S312).

The processor 26 obtains two RRO correction amounts at two learning positions (S313). The processor 26 records two RRO correction amounts as the RRO bits in the servo sector SV right before the target servo sector SV (S313). Then, the operation of recording the RRO bits related to the target servo sector SV is completed.

Note that, also in the description of the second embodiment, it is assumed that the distance from one candidate learning position that configures the pair of candidate learning positions to the track center is equal to the distance from another candidate learning position that configures the pair of candidate learning positions to the track center. The distance from one candidate learning position that configures the pair of candidate learning positions to the track center may be different from the distance from another candidate learning position that configures the pair of candidate learning positions to the track center.

As described above, in the second embodiment, for example, by the processing illustrated in S302 to S303, the processor 26 measures the RPE without correcting the RRO and executes the operation of obtaining the RRO by dividing the RPE by the sensitivity characteristic of the magnetic head 22 in the range of −DOL to +DOL, thereby obtaining the distribution of the RRO. Then, for example, by the processing illustrated in S305 to S306, the processor 26 estimates the change in the RRO correction amount based on the RRO correction amount at each candidate learning position that configures one set of candidate learning positions. Then, for example, the processor 26 obtains the distribution of the residual error which is the difference between the RRO and the change in the RRO correction amount by the processing illustrated in S307. Then, for example, by the processing illustrated in S309, the distribution of the residual error is weighted according to the offset position, and the evaluation value is calculated based on the weighted distribution of the residual error. The processor 26 obtains the evaluation value for each set of candidate learning positions, and selects the set of learning positions from among the plurality of sets of candidate learning positions based on the evaluation value obtained for each set of candidate learning positions.

Therefore, when the distribution of the RRO is obtained in S302 to S303, thereafter, the set of learning positions can be determined based only on the calculation. That is, in the second embodiment, the number of times of measurement of the RPE required to determine the set of learning positions can be suppressed, whereby the total time required to record the RRO bit can be shortened.

In the above description, it is assumed that the processor 26 is configured to use two learning positions as a first position set. Each first position set may include three or more of learning positions. The processor 26 may be configured to use all lerning positions as a first position set.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk having a track provided with a first servo sector;
a magnetic head that writes data to the magnetic disk and reads data from the magnetic disk; and
a controller that
sets a plurality of first position sets each of which is a set including a plurality of positions in a radial direction on the track,
obtains, for each of the plurality of first position sets, a first distribution that is a radial distribution of differences while correcting a disturbance synchronized with rotation of the magnetic disk by using correction amounts at a plurality of positions included in one of the plurality of first position sets, each of the differences being a difference between a target orbit of the magnetic head and an actual position of the magnetic head,
executes an operation of weighting the first distribution according to a position in the radial direction and calculating an evaluation value based on the weighted first distribution for each of the plurality of first position sets,
selects a second position set from the plurality of first position sets based on the evaluation value calculated for each of the plurality of first position sets, and
records correction amounts at a plurality of positions included in the second position set in the first servo sector by the magnetic head, wherein
a write permission range that is a range in the radial direction including a center of the track permitted to write to the track is set, and
the controller performs weighting with a maximum weight at an end of the write permission range.

2. The magnetic disk device according to claim 1, wherein the controller performs weighting with the maximum weight in the center of the track in addition to the end.

3. The magnetic disk device according to claim 2, wherein the controller performs weighting with a minimum weight at a predetermined position between the center of the track and the end of the write permission range.

4. The magnetic disk device according to claim 1, wherein the controller performs weighting with a minimum weight in the center of the track.

5. The magnetic disk device according to claim 1, wherein the controller performs weighting with a minimum weight in a range narrower than the write permission range including the center of the track.

6. The magnetic disk device according to claim 1, wherein the magnetic disk is divided into a plurality of unit regions, and
the controller performs weighting on the first distribution using a weight function, the weight function to be used being individually set for each unit region.

7. A magnetic disk device comprising:
a magnetic disk having a track provided with a first servo sector;
a magnetic head that writes data to the magnetic disk and reads data from the magnetic disk; and
a controller that
sets a plurality of first position sets each of which is a set including a plurality of positions in a radial direction on the track,
detects a difference between a target orbit of the magnetic head and an actual position of the magnetic head without correcting a disturbance synchronized with rotation of the magnetic disk, obtains an estimated value of the disturbance by dividing the difference by a sensitivity characteristic of positioning control system of the magnetic head, and obtains a first distribution that is a radial distribution of the estimated value of the disturbance,
estimates a change in a correction amount in the radial direction based on the correction amounts at the plurality of positions included in one first position set,
sets a difference between the change in the correction amount and the first distribution as a second distribution,
executes an operation of weighting the second distribution according to a position in the radial direction and calculating an evaluation value based on the weighted second distribution for each of the plurality of first position sets,
selects a second position set from the plurality of first position sets based on the evaluation value calculated for each of the plurality of first position sets, and
records correction amounts at a plurality of positions included in the second position set in the first servo sector by the magnetic head, wherein
a write permission range that is a range in the radial direction including a center of the track permitted to write to the track is set, and
the controller performs weighting with a maximum weight at an end of the write permission range.

8. The magnetic disk device according to claim 7, wherein the controller performs weighting with the maximum weight in the center of the track in addition to the end.

9. The magnetic disk device according to claim 8, wherein the controller performs weighting with a minimum weight at a predetermined position between the center of the track and the end of the write permission range.

10. The magnetic disk device according to claim 7, wherein the controller performs weighting with a minimum weight in the center of the track.

11. The magnetic disk device according to claim 7, wherein the controller performs weighting with a minimum weight in a range narrower than the write permission range including the center of the track.

12. The magnetic disk device according to claim 7, wherein the magnetic disk is divided into a plurality of unit regions, and
the controller performs weighting on the second distribution using a weight function, the weight function to be used being individually set for each unit region.

13. A method for controlling a magnetic disk device including a magnetic disk and a magnetic head that writes data to the magnetic disk and reads data from the magnetic disk, the method comprising:

setting a plurality of first position sets each of which is a set including a plurality of positions in a radial direction on a track provided with a first servo sector included in the magnetic disk;

obtaining, for each of the plurality of first position sets, a first distribution that is a radial distribution of differences while correcting a disturbance synchronized with rotation of the magnetic disk by using correction amounts at a plurality of positions included in one of the plurality of first position sets, each of the differences being a difference between a target orbit of the magnetic head and an actual position of the magnetic head;

executing an operation of weighting the first distribution according to a position in the radial direction and calculating an evaluation value based on the weighted first distribution for each of the plurality of first position sets;

selecting a second position set from the plurality of first position sets based on the evaluation value calculated for each of the plurality of first position sets; and recording correction amounts at a plurality of positions included in the second position set in the first servo sector by the magnetic head, wherein the method further comprises:

setting a write permission range that is a range in the radial direction including a center of the track permitted to write to the track; and performing weighting with a maximum weight at an end of the write permission range.

14. A method for controlling a magnetic disk device including a magnetic disk and a magnetic head that writes data to the magnetic disk and reads data from the magnetic disk, the method comprising:

setting a plurality of first position sets each of which is a set including a plurality of positions in a radial direction on a track provided with a first servo sector included in the magnetic disk;

detecting a difference between a target orbit of the magnetic head and an actual position of the magnetic head without correcting a disturbance synchronized with rotation of the magnetic disk, obtaining an estimated value of the disturbance by dividing the difference by a sensitivity characteristic of positioning control system of the magnetic head, and obtaining a first distribution that is a radial distribution of the estimated value of the disturbance;

estimating a change in a correction amount in the radial direction based on the correction amounts at the plurality of positions included in one first position set;

setting a difference between the change in the correction amount and the first distribution as a second distribution;

executing an operation of weighting the second distribution according to a position in the radial direction and calculating an evaluation value based on the weighted second distribution for each of the plurality of first position sets;

selecting a second position set from the plurality of first position sets based on the evaluation value calculated for each of the plurality of first position sets; and recording correction amounts at a plurality of positions included in the second position set in the first servo sector by the magnetic head, wherein the method further comprises:

setting a write permission range that is a range in the radial direction including a center of the track permitted to write to the track; and performing weighting with a maximum weight at an end of the write permission range.

15. The method according to claim 14, further comprising:

dividing the magnetic disk into a plurality of unit regions; and performing weighting on the second distribution using a weight function, wherein the weight function to be used is individually set for each unit region.

* * * * *